United States Patent
Nguyen et al.

(10) Patent No.: US 10,779,193 B2
(45) Date of Patent: Sep. 15, 2020

(54) TRANSMISSIONS IN A HALF DUPLEX BASED WIRELESS COMMUNICATION SYSTEM

(71) Applicant: QUALCOMM Incorporated, San Diego, CA (US)

(72) Inventors: Tien Viet Nguyen, Bridgewater, NJ (US); Kapil Gulati, Hillsborough, NJ (US); Arjun Bharadwaj, Poway, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/680,110

(22) Filed: Nov. 11, 2019

(65) Prior Publication Data

US 2020/0154315 A1 May 14, 2020

Related U.S. Application Data (60) Provisional application No. 62/760,812, filed on Nov. 13, 2018.

(51) Int. Cl.
*H04W 28/06* (2009.01)
*H04L 1/00* (2006.01)
*H04W 28/02* (2009.01)
*H04L 5/16* (2006.01)

(52) U.S. Cl.
CPC ......... *H04W 28/065* (2013.01); *H04L 1/0005* (2013.01); *H04L 5/16* (2013.01); *H04W 28/0284* (2013.01)

(58) Field of Classification Search
None
See application file for complete search history.

(56) References Cited

U.S. PATENT DOCUMENTS

| | | | |
|---|---|---|---|
| 2003/0072283 A1 | 4/2003 | Varshney et al. | |
| 2010/0275082 A1* | 10/2010 | Haustein | H04L 1/189 714/748 |
| 2016/0119105 A1 | 4/2016 | Jiang et al. | |
| 2019/0115999 A1* | 4/2019 | Sundman | H04L 1/0036 |

FOREIGN PATENT DOCUMENTS

WO 2015048675 A1 4/2015

OTHER PUBLICATIONS

International Search Report and Written Opinion—PCT/US2019/061012—ISA/EPO—Apr. 21, 2020 (190465WO).

* cited by examiner

*Primary Examiner* — Diane L Lo
(74) *Attorney, Agent, or Firm* — Arent Fox LLP (57) ABSTRACT

Methods, apparatuses, and computer-readable mediums for wireless communication include re-coding a first coded packet into a second coded packet, wherein the second coded packet includes less coded bits and has a higher modulation order than the first packet, generating one or more redundant versions of the second packet, and transmitting the second packet and the one or more redundant versions of the second packet at different times to a receiving user equipment.

7 Claims, 5 Drawing Sheets

TRANSMISSIONS IN A HALF DUPLEX BASED WIRELESS COMMUNICATION SYSTEM

CROSS REFERENCE TO RELATED APPLICATIONS

The present application claims priority to U.S. Provisional Application No. 62/760,812 entitled "Transmissions in a Half Duplex Based Wireless Communication System," filed on Nov. 13, 2018, the contents of which are incorporated by reference in their entireties.

BACKGROUND

The present disclosure relates generally to communication systems, and more particularly, to transmissions and receptions in a half-duplex based wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

There exists a need for further improvements in 5G NR technology, as the need for high reliability communications may be constrained by limited availability of network resources.

For example, a vehicle-to-anything (V2X) communication system has to support a relatively large packet size. Further, to meet a required transmission range, it is inevitable to increase a transmission time. In addition, in a V2X communication system, half duplex transmission are used, which may lead to packets not being received. For example, if three UEs have even partially overlapping transmission times, then they cannot receive transmissions from each other due to the half-duplex nature of the transmissions. Accordingly, using a relatively large packet size combined with a relatively long transmission time leads to relatively higher half duplex losses, since every time a UE transmits it cannot receive other packets during the duration of the transmission.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and non-transitory computer-readable mediums for wireless communication are disclosed by the present disclosure.

In an aspect, a method of wireless communication comprises re-coding a first coded packet into a second coded packet, wherein the second coded packet includes less coded bits and has a higher modulation order than the first packet, generating one or more redundant versions of the second packet, and transmitting the second packet and the one or more redundant versions of the second packet at different times to a receiving user equipment.

In certain aspects, an apparatus of wireless communication comprises a memory and one or more processors configured to perform the steps of re-coding a first coded packet into a second coded packet, wherein the second coded packet includes less coded bits and has a higher modulation order than the first packet, generating one or more redundant versions of the second packet, and transmitting the second packet and the one or more redundant versions of the second packet at different times to a receiving user equipment.

In other aspects, a non-transitory computer readable medium having code to perform the steps of re-coding a first coded packet into a second coded packet, wherein the second coded packet includes less coded bits and has a higher modulation order than the first packet, generating one or more redundant versions of the second packet, and transmitting the second packet and the one or more redundant versions of the second packet at different times to a receiving user equipment.

In an aspect, a user equipment may include means for re-coding a first coded packet into a second coded packet, wherein the second coded packet includes less coded bits and has a higher modulation order than the first packet, means for generating one or more redundant versions of the second packet, and means for transmitting the second packet and the one or more redundant versions of the second packet at different times to a receiving user equipment.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

The present aspects provide methods, apparatuses, computer readable media, and means for transmitting and receiving data in half-duplex mode in V2X communications.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In some implementations, a NR V2X and/or vehicle-to-vehicle (V2V) communication network may support packets of varying sizes. Larger data packets may require longer transmission time than smaller data packets due to increased size. User equipment in the NR V2X and/or V2V communication network may operate using a half-duplex communication mode. The UEs in half-duplex mode may transmit and receive data, but not simultaneously. When the UEs transmit data using half-duplex mode, the UEs may not be able to receive any data, which may lead to data losses.

In an aspect of the present disclosure, a transmitting UE in the NR V2X and/or V2V network may re-encode a longer packet with a higher modulation order (relative to the coding used to form the longer packet) and/or higher coding rate to form a shorter packet having a shorter transmission duration. Further, the transmitting UE may re-transmit the shorter packet for a number of repetitions. The combination of the shorter packet with the higher modulation order and the number of repetitions of the shorter packet may help to avoid half duplex packet losses, and improve the efficiently of communications in the network.

More particularly, the higher modulation order (relative to the coding used to form the longer packet) may include a higher modulation and coding scheme (MCS), which can operate to condense the data in the longer packet into the shorter packet. In some implementations, the signal to noise ratio (SNR) to decode a single copy of the shorter packet may be high, and as a result it may be difficult for the shorter packet to meet a required communication range. For example, the receiving UE may be too far away to properly decode the shorter packet sent by the transmitting UE. Consequently, the number of repetitions of the shorter packet may be increased, as when the number of repetitions of the shorter packet increases then the SNR requirement decreases because of the increasing chance of decoding the data in the shorter packet by the receiving UE. As such, in the present disclosure, the number of repetitions may be based on the required communication range. If one repetition is lost (e.g., due to being half-duplex) at the receiving UE, then due to the reduction in the required communication range and the number of repetitions of the shorter packet, the receiving UE still has a chance to decode the data in the shorter packet from the other repetitions. Further, under the same required communication range, the larger packet may require a higher number of repetitions than the shorter packet.

Thus, an aspect of the present disclosure includes flexible repetition numbers to accommodate the required communication range, which reduces the half-duplex penalty (e.g., potential collision with other transmitted packets) using shortened packets, accommodating the required communicating range for all packet sizes.

In summary, UEs operating in half-duplex mode may shorten a packet and generate redundant versions of the shortened packet. The UEs may transmit the shortened packet and the redundant versions of the shortened packet to other UEs operating in half-duplex mode to decrease loss of data stemming from transmission collisions.

Figure 1:
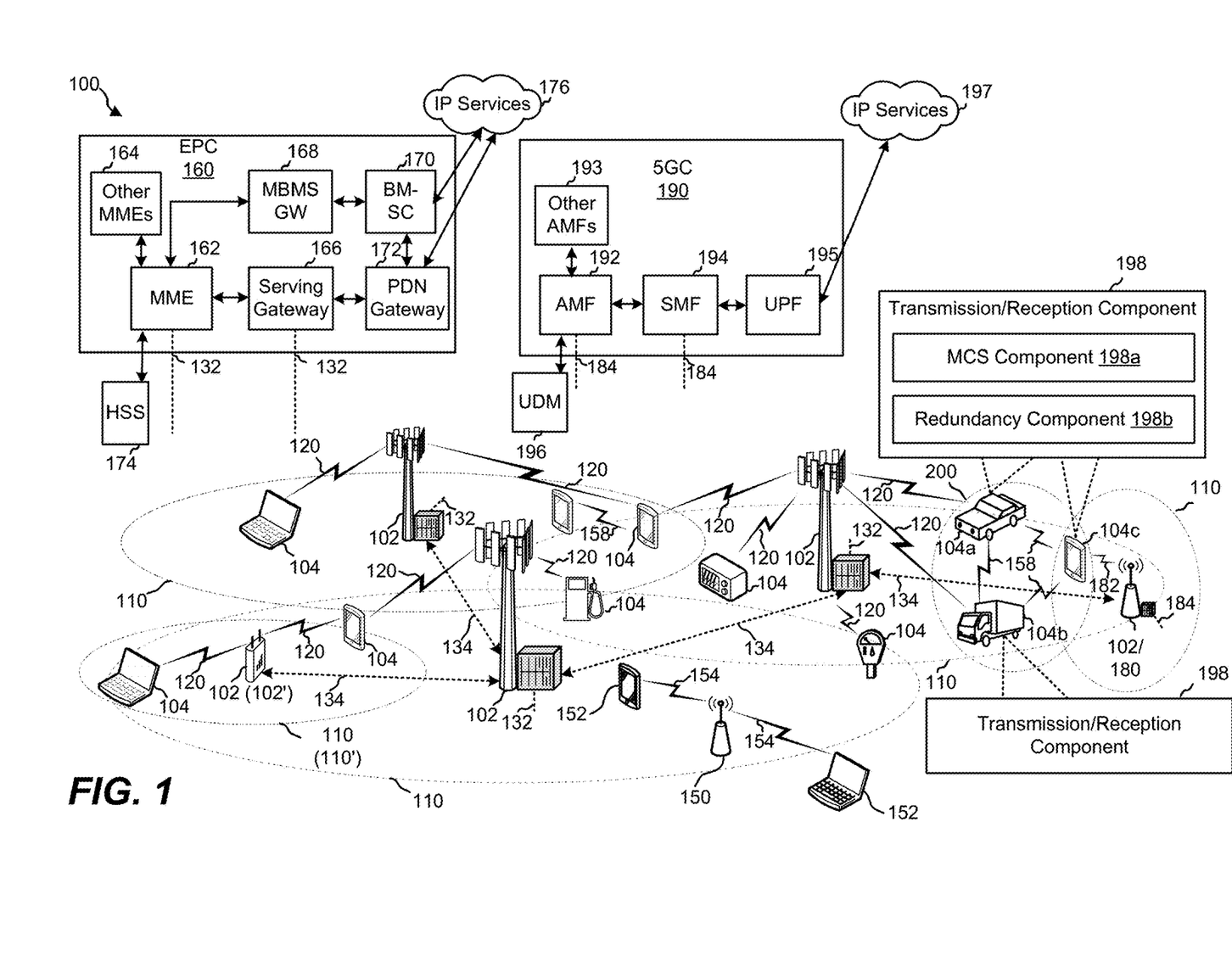
FIG. 1 is a schematic diagram of an example wireless communications system and an access network.

Referring to FIG. 1, an example of a wireless communications system and an access network 100 includes UEs 104 that may be configured for wireless communications. For example, in an aspect, some UEs 104 may be configured for performing V2V and/or V2X communications with other UEs 104, over device-to-device (D2D) communication links 158 in a D2D communications system 200. The UEs 104 may include various devices related to vehicles and transportation. For example, the UEs 104 may include vehicles, devices within vehicles, and transportation infrastructure such as roadside devices, tolling stations, fuel supplies, or any other device that may communicate with a vehicle.

In particular, the UEs 104 are configured to re-encode a larger packet into multiple repetitions of a smaller packet for V2V and/or V2X half-duplex communications in the D2D communications system 200, which may help to improve reception of the packet by a receiving UE while reducing half duplex losses. For example, in an aspect, the UEs 104 in the D2D communications system 200 may include a transmission/reception component 198 configured to transmit and/or receive data packets from other UEs 104. In some aspects, the UEs 104 may include a modulation and coding scheme component 198a configured to re-encode the data in a first packet into a second packet smaller than the first packet. The first packet may have been coded at a first modulation order, while the second packet is encoded with a second modulation order higher than the first modulation order, thereby resulting in a length of the packet being shorter. In certain aspects, the UEs 104 may include a redundancy component 198b configured to generate and transmit one or more redundant versions of the second packet in order to enable the shorter packet to be received within a required communication range, e.g., to reduce a required signal-to-noise ratio (SNR) for receiving the shorter packet. Further, by transmitting a number of repetitions of the second packet, the chance of avoiding collisions with other transmissions may be overcome or the chance of at least one of the number of repetitions being received improves, thereby improving the efficiency of the D2D communication system 200.

Further details of the D2D communications system 200, a first UE 104a, a second UE 104b, a third UE 104c and the features of the present disclosure are described below with reference to FIGS. 2-5.

Still referring to FIG. 1, the wireless communications system (also referred to as a wireless wide area network (WWAN)) further includes base stations 102, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cells and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

As mentioned above, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. Additionally, the D2D communication link 158 may be implemented in vehicular systems, such as vehicle-to-vehicle (V2V) and/or vehicle-to-everything (V2X) networks and/or enhanced vehicle-to-everything (eV2X) networks.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
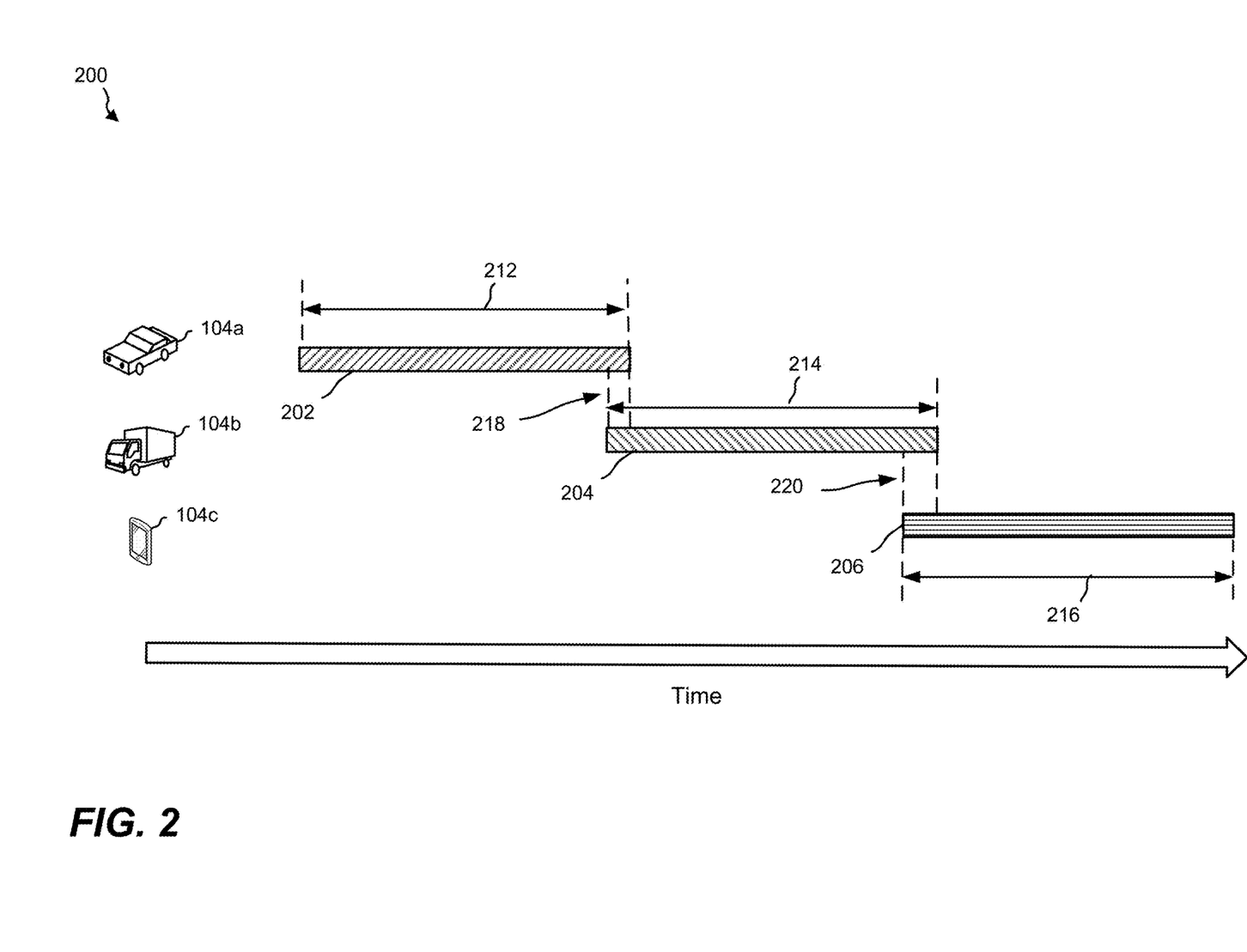
FIG. 2 is an example of a timing diagram showing transmissions of data packet by UEs operating in half-duplex mode.

Referring to FIG. 2, an example of a timing diagram 200 shows the transmissions of a data packet by each of the first UE 104a, the second UE 104b, and the third UE 104c operating in half-duplex mode, where some transmissions may collide and cannot be received. In some implementations, the first UE 104a may transmit a first data packet 202 during a first time 212 to the second UE 104b and the third UE 104c. The second UE 104b may transmit a second data packet 204 during a second time 214 to the first UE 104a and the second UE 104c. The third UE 104c may transmit a third data packet 206 during a third time 216 to the first UE 104a and the second UE 104b. Since the first UE 104a operates in half-duplex mode, the first UE 104a may be unable to receive any data packet during the first time 212. Similarly, due to half duplex mode operation, the second UE 104b may be unable to receive any data packet during the second time 214 and the third UE 104c may be unable to receive any data packet during the third time 216. Since the first time 212 overlaps 218 in time with the second time 214, and the second time 214 overlaps 220 in time with the third time 216, some data packets may not be received by the first UE 104a, the second UE 104b, and the third UE 104c. For example, the first UE 104a may not receive the second data packet 204 due to the transmission collision or overlap 218 between the transmissions/receptions of the first data packet 202 at the first time 212 and the second data packet 204 at the second time 214. In other examples, the second UE 104b may not receive the first data packet 202 and the second data packet 204 due to the transmission collision or overlap 218 between the transmissions/receptions of the first data packet 202 at the first time 212 and the second data packet 204 at the second time 214, and due to the transmission collision or overlap 220 between the transmissions/receptions of the second data packet 204 at the second time 214 and the third data packet 206 at the third time 216. In another example, the third UE 104c may not receive the second data packet 204 due to the transmission collision or overlap 220 between the transmissions/receptions of the third data packet 206 at the third time 216 and the second data packet 204 at the second time 214.

Figure 3:
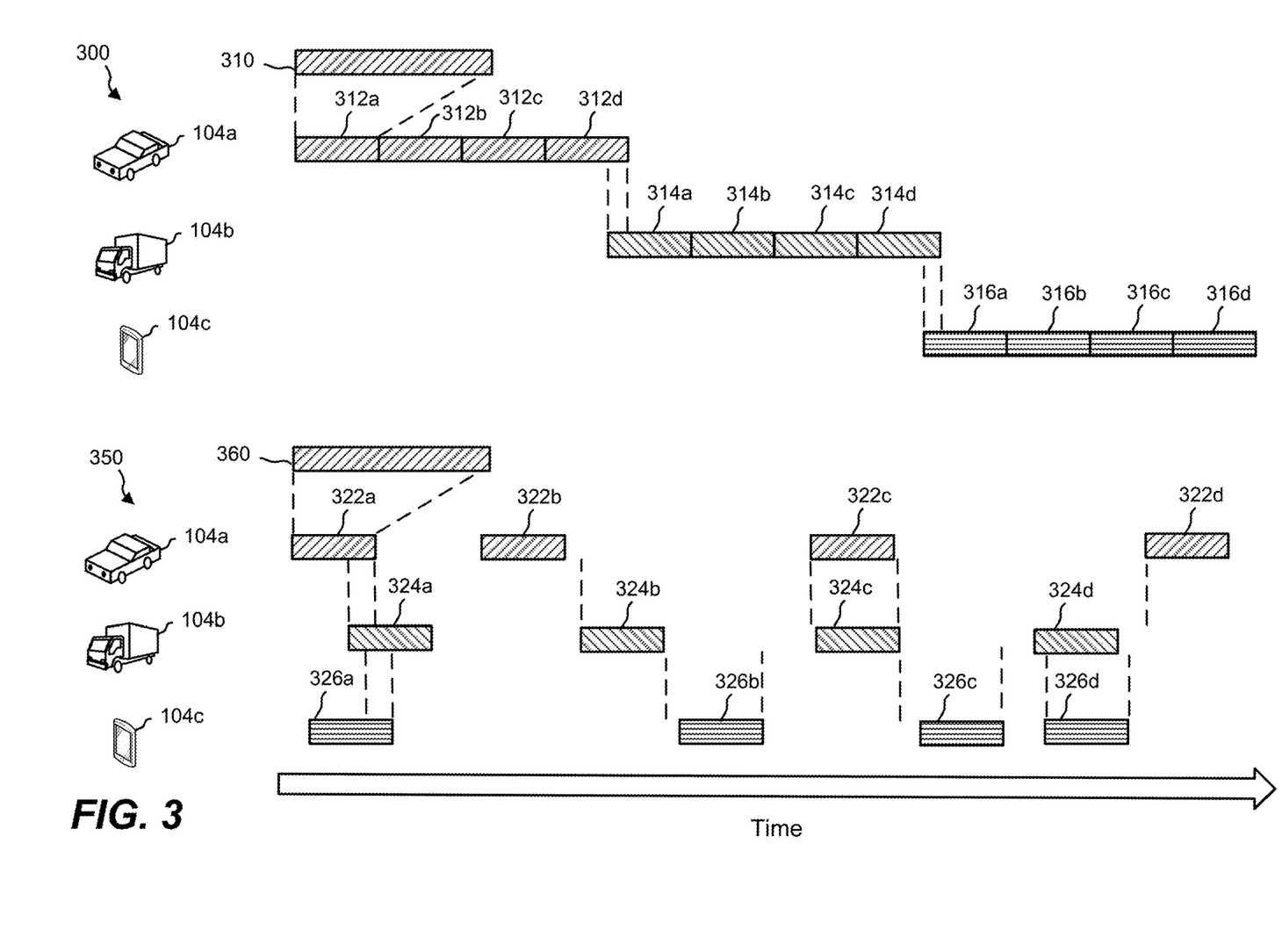
FIG. 3 shows examples of timing diagrams illustrating the transmissions of data in redundant packets by the UEs operating in half-duplex mode.

Referring to FIG. 3, in an aspect of the present disclosure, example timing diagrams 300 and 350 include the transmissions of data in a number of repetitions of relatively shorter (e.g., relatively higher modulation order), redundant packets by the first UE 104a, the second UE 104b, and the third UE 104c operating in half-duplex mode. Timing diagram 300 includes an example of the number of repetitions of relatively shorter, redundant packets being consecutive, e.g., one after the other. In contrast, timing diagram 350 includes an example of the number of repetitions of relatively shorter, redundant packets being non-consecutive, e.g., spaced apart in time and/or frequency.

In some implementations, referring to timing diagram 300, the first UE 104a may re-code a longer packet 310, using a selected relatively higher order modulation and/or coding rate (e.g., a higher MCS), into a first shortened packet 312a. A first MCS used to code the longer packet 310 may include an MCS value lower than the MCS value of a second MCS used to re-code the longer packet 310 into the first shortened packet 312a The first UE 104a may select the second MCS based on a required communication range between the first UE 104a and the second UE 104b/third UE 104c. The UEs 104 may determine the required communication range among the UEs 104 based on a quality of service (QoS) requirement associated with transmitting the packet. Also, alternatively or in addition, the first UE 104a may select the second MCS based on the bit size of the longer packet 310, e.g., in order to select that highest MCS in order to finish transmitting the packet within a predefined time threshold (e.g., 1 or 2 slots). In some examples, the second MCS may be based on one or more of the factors discussed above.

In other words, the longer packet 310 may be a first coded packet (e.g., an original data packet encoded according to a first modulation order) that may be traditionally sent by the first UE 104a, which results in a relatively long transmission time, which increases the time when the first UE 104a cannot receive other transmissions. According to this disclosure, instead of transmitting the longer packet 310, the first UE 104a re-codes the original packet using a second, relatively higher modulation order, as compared the first modulation order, resulting in the shorter packet, which may be duplicated into one or more shorter packets (e.g., shorter packets 312a-312d) for use in a number of repetitions of the original transmission, e.g., to improve the chance of being received by a receiving UE. As such, the original packet size is fixed, but according to this disclosure the first UE 104a uses a relatively higher modulation order (or MCS) so that the coding rate is higher, so less coded bits are generated for the same packet size, and thus the number of coded bit carried per tone per OFDM symbol is higher (e.g., a relatively higher order modulation, such as 64QAM, carries 6 bits per tone per OFDM symbol as compared to a relatively lower modulation order, such as QPSK, which carries 2 bits per tone per symbol) so that fewer number of tones and OFDM symbols is needed to carry the entire coded packet.

In certain implementations, the first UE 104a may transmit the first shortened packet 312a, a first redundant packet 312b, a second redundant packet 312c, and a third redundant packet 312d to the second UE 104b and/or the third UE 104c. The number of redundant packets may be 1, 2, 3, 4, 5, 10, 20, 50, and may depend on the required SNR value at the receiver (e.g., the second UE 104b or the third UE 104c). Alternatively or additionally, the number of redundant packets may depend on the congestion level of the transmission (e.g., a level of other transmissions in the vicinity of the transmitting UE, a number of UEs in the vicinity of the transmitting UE, a number of collisions in the network) of the longer packet 310. For instance, the first UE 104a may determine a congestion index corresponding to the congestion level based on a measurement. In one implementation, the first UE 104a will perform some measurement, e.g., measuring a level of received energy (or noise), and from the measurement determine the congestion level. In some examples, the number of redundant packets may be based on one or more of the factors discussed above.

In some cases, the first UE 104a may first select the highest MCS possible in order to finish transmitting a packet within a time threshold. If the packet is too large to meet this goal, then the first UE 104 may have to increase the amount of time used to transmit the packet (e.g., increase the number of slots), while still using the highest MCS available. Further, the first UE 104a may then determine the number of repetitions based on the required communication range and/or the congestion level.

In some implementations, the second UE 104b may transmit the second shortened packet 314a (re-coded from a longer packet), a first redundant packet 314b, a second redundant packet 314c, and a third redundant packet 314d to the first UE 104a and/or the third UE 104c. The third UE 104b may transmit the third shortened packet 316a (re-coded from a longer packet), a first redundant packet 316b, a second redundant packet 316c, and a third redundant packet 316d to the second UE 104b and/or the second UE 104b.

Since the first UE 104a may operate in half-duplex mode, the first UE 104a may not receive the second shortened packet 314a due to the overlap in transmission time between the third redundant packet 312d and the second shortened packet 314a. However, the first UE 104a may receive one or more of the first redundant packet 314b, the second redundant packet 314c, and/or the third redundant packet 314d. The first UE 104a may decode one or more of the first redundant packet 314b, the second redundant packet 314c, and/or the third redundant packet 314d to obtain the data stored therein. The data stored in the first redundant packet 314b, the second redundant packet 314c, and/or the third redundant packet 314d may be identical to the data in the second shortened packet 314a. The first UE 104a may receive and decode the data stored in the third shortened packet 316a, the first redundant packet 316b, a second redundant packet 316c, and the third redundant packet 316d Since the second UE 104b may operate in half-duplex mode, the second UE 104b may not receive the third redundant packet 312d and/or the third shortened packet 316a due to the overlap in transmission time between the third redundant packet 312d and the second shortened packet 314a and/or between the third redundant packet 314d and the third shortened packet 316a. However, the second UE 104b may receive one or more of the first shortened packet 312a, the first redundant packet 312b and/or the second redundant packet 312c. The second UE 104b may decode one or more of the first shortened packet 312a, the first redundant packet 312b and/or the second redundant packet 312c to obtain the data stored therein. The data stored in the first redundant packet 312b and/or the second redundant packet 312c may be identical to the data in the first shortened packet 312a. The data stored in the first redundant packet 312b and/or the second redundant packet 312c may be identical to the data in the first shortened packet 312a. Similarly, the second UE 104b may receive one or more of the first redundant packet 316*b*, the second redundant packet 316*c*, and/or the third redundant packet 316*d*. The second UE 104*b* may decode one or more of the first redundant packet 316*b*, the second redundant packet 316*c*, and/or the third redundant packet 316*d* to obtain the data stored therein. The data stored in the first redundant packet 316*b*, the second redundant packet 316*c*, and/or the third redundant packet 316*d* may be identical to the data in the third shortened packet 316*a*.

Since the third UE 104*c* may operate in half-duplex mode, the third UE 104*c* may not receive the third redundant packet 314*d* due to the overlap in transmission time between the third redundant packet 314*d* and the third shortened packet 316*a*. However, the third UE 104*c* may receive one or more of the second shortened packet 314*a*, the first redundant packet 314*b*, and/or the second redundant packet 314*c*. The third UE 104*c* may decode one or more of the second shortened packet 314*a*, the first redundant packet 314*b*, and/or the second redundant packet 314*c* to obtain the data stored therein. The third UE 104*c* may receive and decode the data stored in the first shortened packet 312*a*, the first redundant packet 312*b*, a second redundant packet 312*c*, and the third redundant packet 312*d*

In another implementation where the number of repetitions are non-consecutive, referring to timing diagram 350, the first UE 104*a* may transmit the first shortened packet 322 (re-coded from a longer packet 360) a, a first redundant packet 322*b*, a second redundant packet 322*c*, and a third redundant packet 322*d* to the second UE 104*b* and/or the third UE 104*c* at spaced apart times (and, optionally, on one or more different frequencies). The second UE 104*b* may transmit the second shortened packet 324*a*, a first redundant packet 324*b*, a second redundant packet 324*c*, and a third redundant packet 324*d* at spaced apart times (and, optionally, on one or more different frequencies) to the first UE 104*a* and/or the third UE 104*c*. The third UE 104*b* may transmit the third shortened packet 326*a*, a first redundant packet 326*b*, a second redundant packet 326*c*, and a third redundant packet 326*d* at spaced apart times (and, optionally, on one or more different frequencies) to the second UE 104*b* and/or the second UE 104*b*.

As explained above, certain packets transmitted by the first UE 104*a*, the second UE 104*b*, and the third UE 104*c* operating in half-duplex mode may not be received by target UEs due to transmission collisions. For example, in timing diagram 350, the first UE 104*a* may not receive the second shortened packet 324*a* and the third shortened packet 326*a* due to the transmission of the first shortened packet 322*a*. The second UE 104*b* may not receive the first shortened packet 322*a* and the third shortened packet 326*a* due to the transmission of the second shortened packet 324*a*. The third UE 104*c* may not receive the first shortened packet 322*a* and the second shortened packet 324*a* due to the transmission of the third shortened packet 326*a*.

In other examples, in timing diagram 350, the first redundant packets 322*a*, 324*a*, 326*a* may be received by the first UE 104*a*, the second UE 104*b*, and the third UE 104*c* due to an absence of collision. The third UE 104*c* may receive the second redundant packets 322*c*, 324*c* and the first UE 104*a* may receive the third redundant packets 324*d*, 326*d*.

Thus, in timing diagrams 300 and 350, the first shortened packet and the number of redundant packets may be transmitted consecutively (in time) or non-consecutively (in time, e.g., time hopping), and in some options the first shortened packet and the number of redundant packets may be transmitted using frequency hopping.

Figure 4:
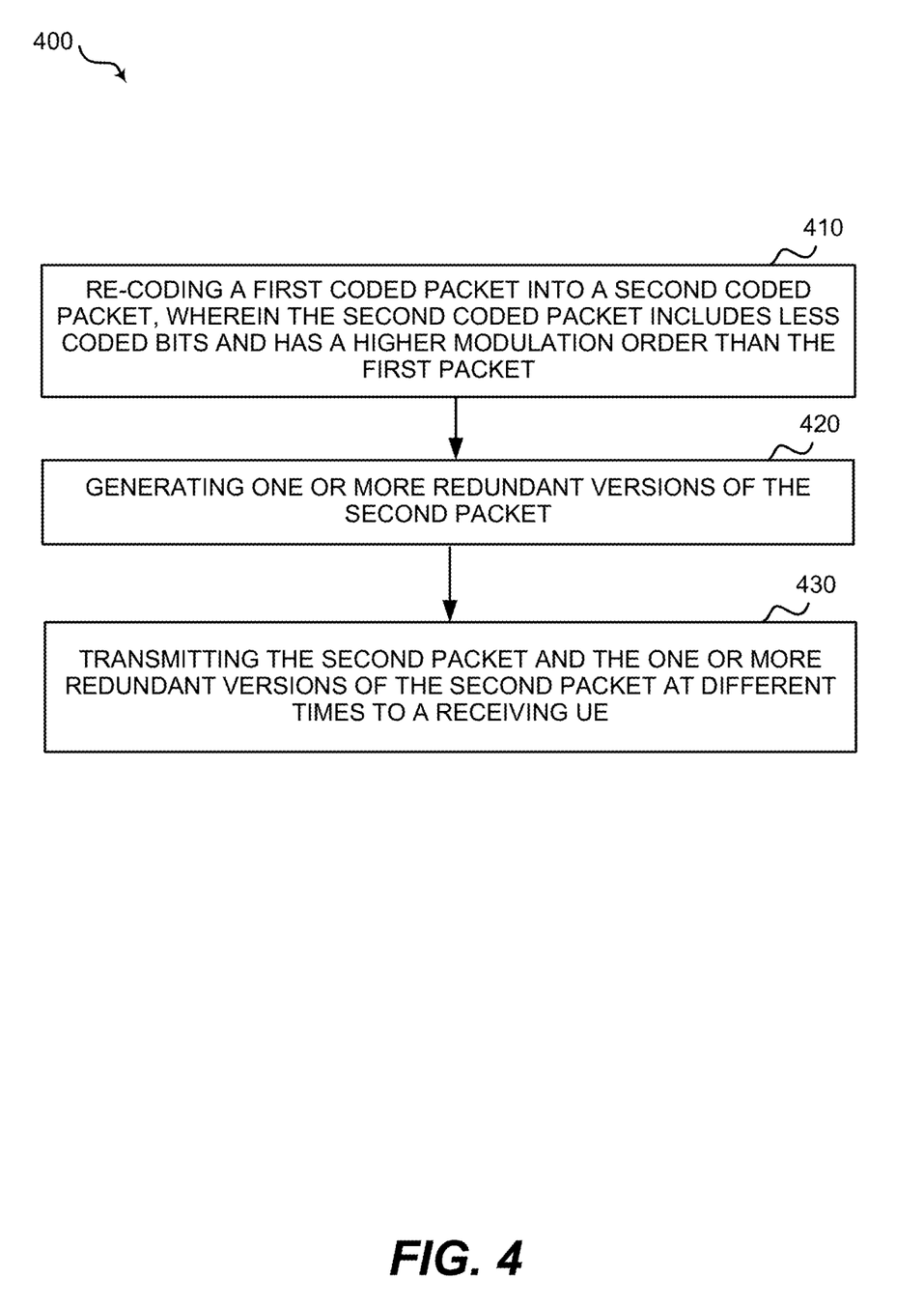
FIG. 4 is a flowchart of an example method of wireless communication.

Referring to FIG. 4, an example of a method 400 of transmissions of data in redundant packets to improve efficiency in half duplex communications may be implemented by at least one of one or more processors 512, a modem 514, the transmission/reception component 198, the MCS component 198*a*, or the redundancy component 198*b* of the UE 104.

At block 410, in certain implementations, the method 400 may re-code a first coded packet into a second coded packet, wherein the second coded packet includes less coded bits and has a higher modulation order than the first packet. For example, as described in more detail above, depending on one or more of the required communication range, the bit size of the first coded packet, the required SNR value, the congestion level, at least one of one or more processors 512, a modem 514, and/or the MCS component 198*a* may re-code the longer packet 310 into one or more shortened packets (e.g., 312*a* to 312*d*) using amplitude shift keying (ASK), amplitude and phase shift keying (APSK), continuous phase modulation (CPM), frequency shift keying (FSM), phase shift keying (PSK), quadrature amplitude modulations (QAM, such as 8-QAM, 16-QAM, 32-QAM, 64-QAM, 128-QAM, 256-QAM), single-carrier frequency division multiple access (SC-FDMA), or other known modulation and coding schemes.

Figure 5:
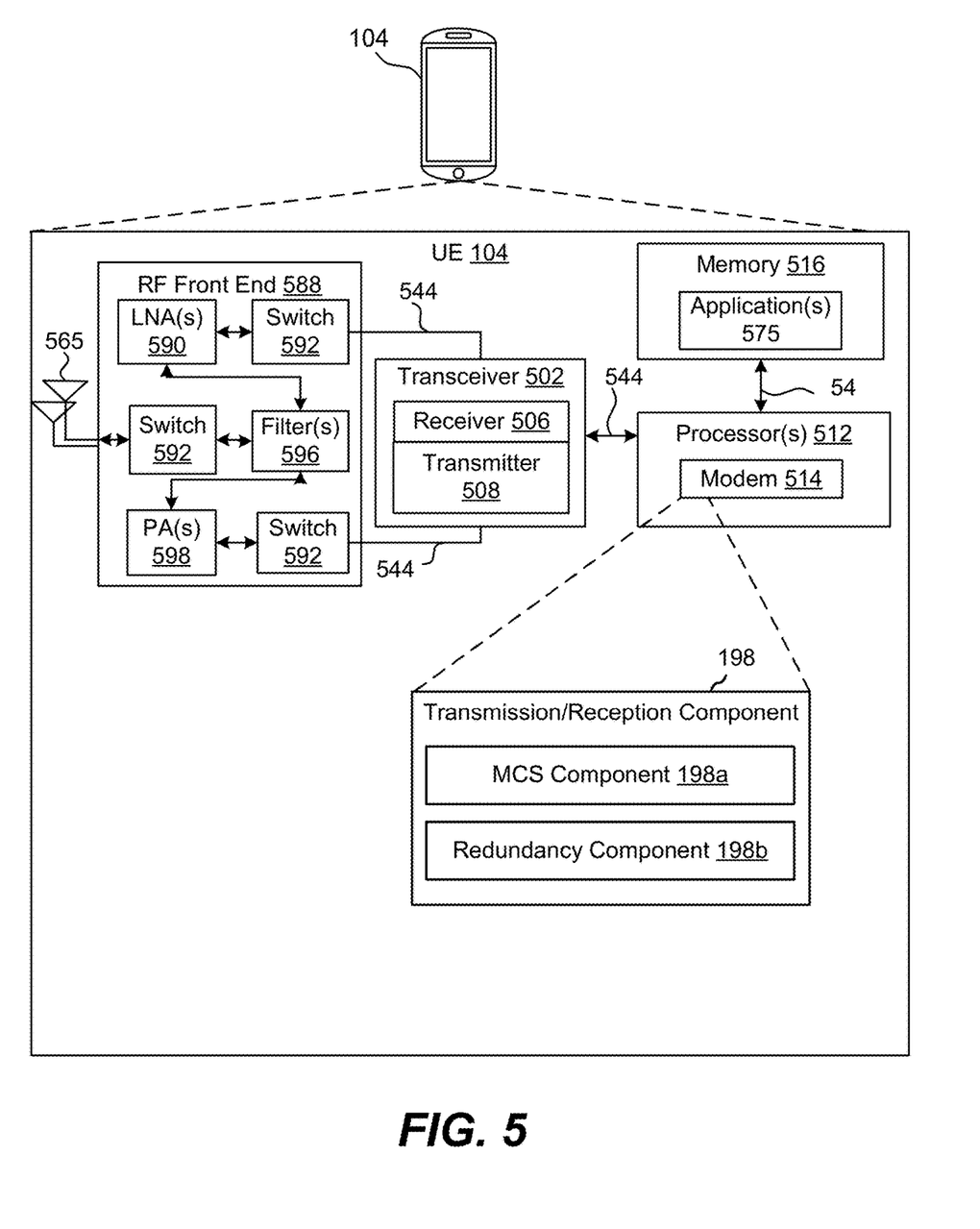
FIG. 5 is a schematic diagram of example components of the UEs of FIG. 1.

In certain implementations, the processor 512, the modem 520, the transmission/reception component 198, the MCS component 198*a*, the transceiver 502, the receiver 506, the transmitter 508, the RF front end 588, and/or one or more of the subcomponents of the RF front end 588 may be configured to and/or may define means for re-coding a first coded packet into a second coded packet, wherein the second coded packet includes less coded bits and has a higher modulation order than the first packet.

At block 420, in certain implementations, the method 400 may generate one or more redundant versions of the second packet. For example, the redundancy component 198*b* may generate the first redundant packet 312*b*, the second redundant packet 312*c*, and the third redundant packet. As described in more detail above, at least one of one or more processors 512, a modem 514, and/or the redundancy component 198*b* may determine the number of redundant versions of the second packet based on one or more of the required communication range, the bit size of the first coded packet, the required SNR value, the congestion level.

In certain implementations, the processor 512, the modem 520, the transmission/reception component 198, the redundancy component 198*b*, the transceiver 502, the receiver 506, the transmitter 508, the RF front end 588, and/or one or more of the subcomponents of the RF front end 588 may be configured to and/or may define means for generating one or more redundant versions of the second packet.

At block 430, in certain implementations, the method 400 may transmit the second packet and the one or more redundant versions of the second packet at different times to a receiving UE. For example, at least one of one or more processors 512, a modem 514, and/or the transmission/reception component 198 of the first UE 104*a* may transmit the first shortened packet 312*a*, the first redundant packet 312*b*, the second redundant packet 312*c*, and the third redundant packet 312*d* to the second UE 104*b* and the third UE 104*c*. The transmission/reception component 198 and/or the processor 512 may transmit and/or receive data, such as the second packet and the one or more redundant versions of the second packet. Specifically, the transmission/reception component 198 may send the digital data associated with the packet to the transceiver 502 or the transmitter 508. The transceiver 502 and/or the transmitter 508 may convert the digital data into electrical data signal, and send to the RF front end 588. The RF front end 588 and one or more of the subcomponents, such as the PAs 598 and/or the filters 596, may filter, amplify, and/or convert the electrical data signals into electro-magnetic transmission signals. The one or more antennas 565 may transmit electro-magnetic transmission signals containing the digital data in the second packet and the one or more redundant versions of the second packet.

In certain implementations, the processor 512, the modem 520, the transmission/reception component 198, the transceiver 502, the receiver 506, the transmitter 508, the RF front end 588, and/or the subcomponents of the RF front end 588 may be configured to and/or may define means for transmitting the second packet and the one or more redundant versions of the second packet at different times to a receiving UE.

In some implementations, the first packet may be associated with a first MCS index having a first MCS value, and wherein the re-coding of the first packet into the second packet may include re-coding at a second MCS index having a second MCS value higher than the first MCS value.

In some examples, the method 400 may optionally determine a required communication range for the first packet and determine the higher order modulation, e.g., a second MCS index having the second MCS value, based on the required communication range, wherein the higher order modulation or the MCS value and a calculated number of the redundant versions of the second packet are based on a combination of two or more of a bit size of the first packet, a required communication range, a required SNR value, or a congestion level, as described above in more detail.

In some non-limiting examples, the method 400 may optionally determine a bit size of the first packet, wherein determining the higher order modulation or the second MCS index having the second MCS value is further based on the bit size of the first packet.

In certain implementations, the method 400 may optionally determine a required SNR value (e.g., based on a QoS requirement for the original packet) for successful receipt of the first packet, determine a calculated number of the redundant versions of the second packet based on the required SNR value, wherein the generating one or more redundant versions of the second packet may include generating the calculated number of the redundant versions of the second packet.

In a non-limiting example, the method 400 may optionally determine a congestion level based on other transmissions (e.g., as measured by the UE), determine a calculated number of the redundant versions of the second packet based on the congestion level, wherein the generating one or more redundant versions of the second packet may include generating the calculated number of the redundant versions of the second packet.

In some examples, the second packet and the one or more redundant versions of the second packet may be transmitted consecutively or non-consecutively.

Referring to FIG. 5, an example of an implementation of the UE 104 may include a variety of components, some of which have already been described above, but including components such as one or more processors 512 and memory 516 and transceiver 502 in communication via one or more buses 544, which may operate in conjunction with modem 514, and the transmission/reception component 198 to enable one or more of the functions described herein related to generating and transmitting redundant versions of a shortened packet in a half-duplex based communication system. Further, the one or more processors 512, modem 514, memory 516, transceiver 502, RF front end 588, and one or more antennas 565, may be configured to support voice and/or data calls (simultaneously or non-simultaneously) in one or more radio access technologies. The one or more antennas 565 may include one or more antennas, antenna elements and/or antenna arrays, and may be controlled for beamforming communications.

In an aspect, the one or more processors 512 can include a modem 514 that uses one or more modem processors. The various functions related to transmission/reception component 198 may be included in modem 514 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with the transmission/reception component 198 may be performed by transceiver 502.

Also, memory 516 may be configured to store data used herein and/or local versions of applications 575, the re-transmission encoding module 198, the re-transmission decoding module 199, and/or one or more of subcomponents thereof being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining the transmission/reception component 198, and/or one or more of subcomponents thereof, and/or data associated therewith, when UE 104 is operating at least one processor 512 to execute the transmission/reception component 198, and/or one or more subcomponents thereof.

Transceiver 502 may include at least one receiver 506 and at least one transmitter 508. The transceiver 502 may be a half-duplex transceiver configured to transmit and receive data, but not simultaneously. Receiver 506 may include hardware, firmware, and/or software code executable by a processor for receiving data, the code comprising instructions and being stored in a memory (e.g., computer-readable medium). Receiver 506 may be, for example, a radio frequency (RF) receiver. In an aspect, receiver 506 may receive signals transmitted by at least one base station 102 or another UE 104. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may include, but is not limited to, an RF transmitter.

Moreover, in an aspect, UE 104 may include RF front end 588, which may operate in communication with one or more antennas 565 and transceiver 502 for receiving and transmitting radio transmissions, for example, wireless communications transmitted by at least one base station 102 or wireless transmissions transmitted by UE 104. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and an associated specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and its specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that UE 104 can communicate with, for example, one or more base stations 102 or one or more cells associated with one or more base stations 102. In an aspect, for example, modem 514 can configure transceiver 502 to operate at a specified frequency and power level based on the UE configuration of the UE 104 and the communication protocol used by modem 514.

In an aspect, modem 514 can be a multiband-multimode modem, which can process digital data and communicate with transceiver 502 such that the digital data is sent and received using transceiver 502. In an aspect, modem 514 can be multiband and be configured to support multiple frequency bands for a specific communications protocol. In an aspect, modem 514 can be multimode and be configured to support multiple operating networks and communications protocols. In an aspect, modem 514 can control one or more components of UE 104 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Additional Implementations

A method of wireless communication may include re-coding a first coded packet into a second coded packet, wherein the second coded packet includes less coded bits and has a higher modulation order than the first packet, generating one or more redundant versions of the second packet, and transmitting the second packet and the one or more redundant versions of the second packet at different times to a receiving user equipment.

Any of the above methods, further comprising determining a required communication range for the first packet and determining the higher modulation order for the second coded packet based on the required communication range.

Any of the above methods, further comprising determining a bit size of the first packet, wherein determining the higher modulation order for the second coded packet based on the bit size of the first packet, Any of the above methods, further comprising determining a required signal to noise ratio (SNR) value for successful receipt of the first packet, determining a calculated number of the redundant versions of the second packet based on the required SNR value, and wherein the generating one or more redundant versions of the second packet includes generating the calculated number of the redundant versions of the second packet.

Any of the above methods, further comprising determining a congestion level based on other transmissions, determining a calculated number of the redundant versions of the second packet based on the congestion level, and wherein the generating one or more redundant versions of the second packet includes generating the calculated number of the redundant versions of the second packet.

Any of the above methods, wherein the higher modulation order and a calculated number of the redundant versions of the second packet are based on a combination of two or more of a bit size of the first packet, a required communication range, a required signal to noise ratio (SNR) value, or a congestion level.

Any of the above methods, further comprising determining a highest possible modulation order to transmit the second packet within a time threshold, wherein the higher modulation order is the highest possible modulation order.

Any of the above methods, further comprising determining that the second packet re-coded with the higher modulation order will not be transmitted within the time threshold, determining a calculated number of the redundant versions of the second packet in response to determining that the second packet re-coded with the higher modulation order will not be transmitted within the time threshold, wherein the calculated number of the redundant versions of the second packet achieves transmission of the second packet within the time threshold, and wherein the generating one or more redundant versions of the second packet includes generating the calculated number of the redundant versions of the second packet and wherein transmitting the second packet and the one or more redundant versions of the second packet includes transmitting the calculated number of the redundant versions of the second packet.

Any of the above methods, wherein the transmitting of the second packet and the one or more redundant versions of the second packet comprises transmitting consecutively.

Any of the above methods, wherein the transmitting of the second packet and the one or more redundant versions of the second packet comprises transmitting non-consecutively.

Any of the above methods, wherein the transmitting of the second packet and the one or more redundant versions of the second packet comprises transmitting at least two of the second packet and the one or more redundant versions of the second packet on different frequencies.

A non-transitory computer readable medium having code to perform the steps of re-coding a first coded packet into a second coded packet, wherein the second coded packet includes less coded bits and has a higher modulation order than the first packet, generating one or more redundant versions of the second packet, and transmitting the second packet and the one or more redundant versions of the second packet at different times to a receiving user equipment.

Any of the non-transitory computer readable media, further comprising code to determine a required communication range for the first packet and determine the higher modulation order for the second coded packet based on the required communication range.

Any of the non-transitory computer readable media, further comprising code to determine a bit size of the first packet, wherein determining the higher modulation order for the second coded packet based on the bit size of the first packet.

Any of the non-transitory computer readable media, further comprising code to determine a required signal to noise ratio (SNR) value for successful receipt of the first packet, determine a calculated number of the redundant versions of the second packet based on the required SNR value, and wherein the generating one or more redundant versions of the second packet includes generating the calculated number of the redundant versions of the second packet.

Any of the non-transitory computer readable media, further comprising code to determine a congestion level based on other transmissions, determine a calculated number of the redundant versions of the second packet based on the congestion level, and wherein the generating one or more redundant versions of the second packet includes generating the calculated number of the redundant versions of the second packet.

Any of the non-transitory computer readable media, wherein the higher modulation order and a calculated number of the redundant versions of the second packet are based on a combination of two or more of a bit size of the first packet, a required communication range, a required signal to noise ratio (SNR) value, or a congestion level.

Any of the non-transitory computer readable media, further comprising code to determine a highest possible modulation order to transmit the second packet within a time threshold, wherein the higher modulation order is the highest possible modulation order.

Any of the non-transitory computer readable media, further comprising code to determine that the second packet re-coded with the higher modulation order will not be transmitted within the time threshold, determine a calculated number of the redundant versions of the second packet in response to determining that the second packet re-coded with the higher modulation order will not be transmitted within the time threshold, wherein the calculated number of the redundant versions of the second packet achieves transmission of the second packet within the time threshold, wherein the generating one or more redundant versions of the second packet includes generating the calculated number of the redundant versions of the second packet, and wherein transmitting the second packet and the one or more redundant versions of the second packet includes transmitting the calculated number of the redundant versions of the second packet.

Any of the non-transitory computer readable media, wherein the transmitting of the second packet and the one or more redundant versions of the second packet comprises transmitting consecutively.

Any of the non-transitory computer readable media, wherein the transmitting of the second packet and the one or more redundant versions of the second packet comprises transmitting at least two of the second packet and the one or more redundant versions of the second packet on different frequencies.

An user equipment for wireless communication may include a memory and one or more processors configured to perform the steps of re-coding a first coded packet into a second coded packet, wherein the second coded packet includes less coded bits and has a higher modulation order than the first packet, generating one or more redundant versions of the second packet, and transmitting the second packet and the one or more redundant versions of the second packet at different times to a receiving user equipment.

Any of the above UEs, wherein the processor is further configured to determine a required communication range for the first packet and determine the higher modulation order for the second coded packet based on the required communication range.

Any of the above UEs, wherein the processor is further configured to determine a bit size of the first packet, and wherein determining the higher modulation order for the second coded packet based on the bit size of the first packet.

Any of the above UEs, wherein the processor is further configured to determine a required signal to noise ratio (SNR) value for successful receipt of the first packet, determine a calculated number of the redundant versions of the second packet based on the required SNR value, and wherein the generating one or more redundant versions of the second packet includes generating the calculated number of the redundant versions of the second packet.

Any of the above UEs, wherein the processor is further configured to determine a congestion level based on other transmissions, determine a calculated number of the redundant versions of the second packet based on the congestion level, and wherein the generating one or more redundant versions of the second packet includes generating the calculated number of the redundant versions of the second packet.

Any of the above UEs, wherein the higher modulation order and a calculated number of the redundant versions of the second packet are based on a combination of two or more of a bit size of the first packet, a required communication range, a required signal to noise ratio (SNR) value, or a congestion level.

Any of the above UEs, wherein the processor is further configured to determine a highest possible modulation order to transmit the second packet within a time threshold, wherein the higher modulation order is the highest possible modulation order.

Any of the above UEs, wherein the processor is further configured to determine that the second packet re-coded with the higher modulation order will not be transmitted within the time threshold, determine a calculated number of the redundant versions of the second packet in response to determining that the second packet re-coded with the higher modulation order will not be transmitted within the time threshold, wherein the calculated number of the redundant versions of the second packet achieves transmission of the second packet within the time threshold, wherein the generating one or more redundant versions of the second packet includes generating the calculated number of the redundant versions of the second packet, and wherein transmitting the second packet and the one or more redundant versions of the second packet includes transmitting the calculated number of the redundant versions of the second packet.

Any of the above UEs, wherein the transmitting of the second packet and the one or more redundant versions of the second packet comprises transmitting at least two of the second packet and the one or more redundant versions of the second packet on different frequencies.

A user equipment may include means for re-coding a first coded packet into a second coded packet, wherein the second coded packet includes less coded bits and has a higher modulation order than the first packet, means for generating one or more redundant versions of the second packet, and means for transmitting the second packet and the one or more redundant versions of the second packet at different times to a receiving user equipment.

Any of the above UEs, further comprising means for determining a required communication range for the first packet, and means for determining the higher modulation order for the second coded packet based on the required communication range.

Any of the above UEs, further comprising means for determining a bit size of the first packet, wherein determining the higher modulation order for the second coded packet based on the bit size of the first packet, Any of the above UEs, further comprising means for determining a required signal to noise ratio (SNR) value for successful receipt of the first packet, means for determining a calculated number of the redundant versions of the second packet based on the required SNR value, and wherein the generating one or more redundant versions of the second packet includes generating the calculated number of the redundant versions of the second packet.

Any of the above UEs, further comprising means for determining a congestion level based on other transmissions, means for determining a calculated number of the redundant versions of the second packet based on the congestion level, and wherein the generating one or more redundant versions of the second packet includes generating the calculated number of the redundant versions of the second packet.

Any of the above UEs, wherein the higher modulation order and a calculated number of the redundant versions of the second packet are based on a combination of two or more of a bit size of the first packet, a required communication range, a required signal to noise ratio (SNR) value, or a congestion level.

Any of the above UEs, further comprising means for determining a highest possible modulation order to transmit the second packet within a time threshold, wherein the higher modulation order is the highest possible modulation order.

Any of the above UEs, further comprising means for determining that the second packet re-coded with the higher modulation order will not be transmitted within the time threshold, means for determining a calculated number of the redundant versions of the second packet in response to determining that the second packet re-coded with the higher modulation order will not be transmitted within the time threshold, wherein the calculated number of the redundant versions of the second packet achieves transmission of the second packet within the time threshold, wherein the generating one or more redundant versions of the second packet includes generating the calculated number of the redundant versions of the second packet, and wherein transmitting the second packet and the one or more redundant versions of the second packet includes transmitting the calculated number of the redundant versions of the second packet.

Any of the above UEs, wherein the transmitting of the second packet and the one or more redundant versions of the second packet comprises transmitting at least two of the second packet and the one or more redundant versions of the second packet on different frequencies.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    re-coding a first coded packet into a second coded packet, wherein the second coded packet includes less coded bits and has a higher modulation order than the first packet;
    generating one or more redundant versions of the second packet;
    transmitting the second packet and the one or more redundant versions of the second packet at different times to a receiving UE,
    and
    wherein the higher modulation order for the second coded packet is based, at least in part, on a required communication range for the first packet, a bit size of the first packet, a time threshold for transmission of the second packet, or some combination thereof.

2. A method of wireless communication at a user equipment (UE), comprising:

re-coding a first coded packet into a second coded packet, wherein the second coded packet includes less coded bits and has a higher modulation order than the first packet;
generating one or more redundant versions of the second packet;
transmitting the second packet and the one or more redundant versions of the second packet at different times to a receiving UE;
wherein a total number of the one or more redundant versions of the second packet is based, at least in part, on a required noise ratio (SNR) value for successful receipt of the first packet, a congestion level based on one or more other transmissions, the time threshold, or some combination thereof.

3. A method of wireless communication at a user equipment (UE), comprising:
re-coding a first coded packet into a second coded packet, wherein the second coded packet includes less coded bits and has a higher modulation order than the first packet;
generating one or more redundant versions of the second packet; and
transmitting the second packet and the one or more redundant versions of the second packet at different times to a receiving UE,
wherein the second packet and the one or more redundant versions of the second packet are transmitted consecutively, or on different frequencies, or both.

4. A non-transitory computer-readable medium of a user equipment (UE), the computer-readable medium storing computer executable code, comprising code to:
re-code a first coded packet into a second coded packet, wherein the second coded packet includes less coded bits and has a higher modulation order than the first packet;
generate one or more redundant versions of the second packet; and
transmit the second packet and the one or more redundant versions of the second packet at different times to a receiving user equipment; and
wherein:
a) the higher modulation order for the second coded packet is based, at least in part, on a required communication range for the first packet, a bit size of the first packet, a time threshold for transmission of the second packet, or some combination thereof;
b) a total number of the one or more redundant versions of the second packet is based, at least in part, on a required noise ratio (SNR) value for successful receipt of the first packet, a congestion level based on one or more other transmissions, the time threshold, or some combination thereof;
c) the second packet and the one or more redundant versions of the second packet are transmitted consecutively, or on different frequencies, or both; or
d) some combination of a), b) or c).

5. A user equipment (UE) for wireless communication, comprising:
a memory; and
a processor in communication with the memory, wherein the processor is configured to:
re-code a first coded packet into a second coded packet, wherein the second coded packet includes less coded bits and has a higher modulation order than the first packet;
generate one or more redundant versions of the second packet; and
initiate transmission of the second packet and the one or more redundant versions of the second packet at different times to a receiving user equipment;
wherein the higher modulation order for the second coded packet is based, at least in part, on a required communication range for the first packet, a bit size of the first packet, a time threshold for transmission of the second packet, or some combination thereof.

6. A user equipment (UE) for wireless communication, comprising:
a memory; and
a processor in communication with the memory, wherein the processor is configured to:
re-code a first coded packet into a second coded packet, wherein the second coded packet includes less coded bits and has a higher modulation order than the first packet;
generate one or more redundant versions of the second packet; and
initiate transmission of the second packet and the one or more redundant versions of the second packet at different times to a receiving user equipment;
wherein a total number of the one or more redundant versions of the second packet is based, at least in part, on a required noise ratio (SNR) value for successful receipt of the first packet, a congestion level based on one or more other transmissions, the time threshold, or some combination thereof.

7. A user equipment (UE), comprising:
means for re-coding a first coded packet into a second coded packet, wherein the second coded packet includes less coded bits and has a higher modulation order than the first packet;
means for generating one or more redundant versions of the second packet; and
means for transmitting the second packet and the one or more redundant versions of the second packet at different times to a receiving UE; and
wherein:
a) the higher modulation order for the second coded packet is based, at least in part, on a required communication range for the first packet, a bit size of the first packet, a time threshold for transmission of the second packet, or some combination thereof;
b) a total number of the one or more redundant versions of the second packet is based, at least in part, on a required noise ratio (SNR) value for successful receipt of the first packet, a congestion level based on one or more other transmissions, the time threshold, or some combination thereof;
c) the second packet and the one or more redundant versions of the second packet are transmitted consecutively, or on different frequencies, or both; or
d) some combination of a), b) or c).

* * * * *